United States Patent [19]
Taylor et al.

[11] Patent Number: 5,904,851
[45] Date of Patent: May 18, 1999

[54] OXYGENATING APPARATUS, METHOD FOR OXYGENATING LIQUID THEREWITH, AND APPLICATIONS THEREOF

[75] Inventors: Darrell L. Taylor, Laguna Hill; Frank Abramoff, Beverly Hill, both of Calif.

[73] Assignee: Life International Products, Inc., Naples, Fla.

[21] Appl. No.: 09/008,736

[22] Filed: Jan. 19, 1998

Related U.S. Application Data

[62] Division of application No. 08/537,884, filed as application No. PCT/US96/00037, Jan. 24, 1996, Pat. No. 5,766,490.

[51] Int. Cl.$^6$ .................................................. C02F 1/72
[52] U.S. Cl. ..................... 210/620; 210/758; 210/137; 210/192; 210/205; 210/253; 261/76; 261/DIG. 75; 426/67; 426/474; 435/286.6; 514/771
[58] Field of Search ................................. 210/620, 758, 210/150, 192, 199, 205, 615, 137, 253; 261/108, 76, 113, 114.1; 424/772; 426/67, 474, 477; 514/771; 435/286.6

[56] References Cited

U.S. PATENT DOCUMENTS

| | | |
|---|---|---|
| 835,886 | 11/1906 | Gunn . |
| 2,326,243 | 8/1943 | Meyer ........................................ 261/11 |
| 2,594,474 | 4/1952 | McGrath .................................. 62/89.5 |
| 3,146,195 | 8/1964 | Berardi .................................... 210/169 |
| 3,704,006 | 11/1972 | Grout ......................................... 259/4 |
| 3,737,382 | 6/1973 | Fletcher ................................... 210/12 |
| 3,746,323 | 7/1973 | Buffington ............................. 261/122 |
| 3,756,576 | 9/1973 | Tremolada ............................... 261/35 |
| 3,960,164 | 6/1976 | Kelley .................................... 137/202 |
| 4,027,045 | 5/1977 | Fedotkin ................................. 426/31 |
| 4,126,544 | 11/1978 | Baensch ................................... 210/11 |
| 4,347,143 | 8/1982 | Righetti .................................. 210/758 |
| 4,370,304 | 1/1983 | Hendriks et al. ................ 261/DIG. 75 |
| 4,674,888 | 6/1987 | Carlson .................................. 366/337 |
| 4,695,378 | 9/1987 | Ackman et al. ..................... 210/198.1 |
| 4,749,493 | 6/1988 | Hicks ..................................... 210/617 |
| 4,749,527 | 6/1988 | Rasmusen ................................ 261/76 |
| 4,793,919 | 12/1988 | McCorquodale ...................... 210/177 |
| 4,863,643 | 9/1989 | Cochran ................................... 261/76 |
| 4,874,509 | 10/1989 | Bullock ................................. 210/169 |
| 4,900,480 | 2/1990 | Litz ...................................... 261/36.1 |
| 4,956,080 | 9/1990 | Josefik ................................... 210/109 |
| 5,006,352 | 4/1991 | Zoltai ...................................... 426/67 |
| 5,013,429 | 5/1991 | Krofta ................................... 210/137 |

(List continued on next page.)

FOREIGN PATENT DOCUMENTS

WO 95/29130  11/1995  WIPO .
WO95/29130  11/1995  WIPO .

OTHER PUBLICATIONS

*Commercial Oxygen Use in Water–Quality Management*, R.E. Speece et al. "Water Environment & Technology", Jul. 1990.

*Hydrodynamics and Gas–Liquid Mass Transfer in a Downward Venturi–Bubble Column Combination*, C.L. Briene et al, Chemical Engineering Science, vol.47 No. 13/14, pp. 3549–3556, 1992.

*Primary Examiner*—Peter A. Hruskoci
*Attorney, Agent, or Firm*—Baker & Daniels

[57] ABSTRACT

A process for enriching water with oxygen, wherein water is conducted through a water inlet into a sealed enriching space and through one or more turbulent mixers in the enriching space, open is introduced through an oxygen inlet into the water in the enriching space before passing through the turbulent mixer, and the oxygen-enriched water is recovered. The invention further includes an aerobic process by carrying out a chemical or microbiological reaction in the oxygen enriched water as the reaction medium, and a therapeutic process of carrying out a therapeutic treatment of a body with an agent containing the oxygen enriched liquid as a vehicle. The invention also concerns as apparatus for enriching water with oxygen, having a water inlet, a sealed enriching space containing an oxygen inlet, and one or more turbulent mixers, and an outlet for oxygenated water.

21 Claims, 3 Drawing Sheets

U.S. PATENT DOCUMENTS

| | | | |
|---|---|---|---|
| 5,045,202 | 9/1991 | Stearns | 210/628 |
| 5,061,377 | 10/1991 | Lee | 210/752 |
| 5,080,802 | 1/1992 | Cairo et al. | 261/DIG. 75 |
| 5,087,377 | 2/1992 | Josefik | 210/703 |
| 5,092,988 | 3/1992 | Womack et al. | 210/90 |
| 5,152,888 | 10/1992 | Koyama | 210/195.3 |
| 5,167,798 | 12/1992 | Yoon | 209/170 |
| 5,167,806 | 12/1992 | Wang et al. | 210/188 |
| 5,200,080 | 4/1993 | Bergman et al. | 210/607 |
| 5,259,997 | 11/1993 | Kazuma | 261/119.1 |
| 5,294,401 | 3/1994 | Hagiwara | 422/48 |
| 5,302,286 | 4/1994 | Semprini | 210/610 |
| 5,356,600 | 10/1994 | Kiyonaga et al. | 422/234 |
| 5,380,471 | 1/1995 | Ban | 261/122.1 |
| 5,396,934 | 3/1995 | Moench | 141/5 |
| 5,403,522 | 4/1995 | Von Berg | 261/36.1 |
| 5,422,045 | 6/1995 | Notar | 261/140.1 |
| 5,433,084 | 7/1995 | Kaiser | 62/306 |
| 5,437,784 | 8/1995 | Meinecke | 209/170 |
| 5,494,583 | 2/1996 | Dieter | 210/721 |
| 5,525,242 | 6/1996 | Kerecz | 210/758 |
| 5,766,490 | 6/1998 | Taylor et al. | 210/758 |
| 5,814,222 | 9/1998 | Zelenak et al. | 210/615 |

OXYGENATING APPARATUS, METHOD FOR OXYGENATING LIQUID THEREWITH, AND APPLICATIONS THEREOF

This application is a division of U.S. patent application Ser. No. 08/537,884, filed Jan. 25, 1996, now U.S. Pat. No. 5,766,490 which is a U.S. national stage application which corresponds to PCT/US96/0037, filed Jan. 24, 1996.

FIELD OF INVENTION

The present invention relates to improved apparatus for oxygenating water and other liquids and a method for oxygenation with that apparatus.

BACKGROUND OF THE INVENTION

The most effective method and apparatus for saturating water with oxygen on an industrial scale is described in international patent application WO 95/29130. (U.S. patent application Ser. No. 08/411,708, now U.S. Pat. No. 5,814,222). According to this known process, water is introduced into a sealed enriching vessel which is under oxygen pressure, the water is subdivided such as by running it over a series of trays and the water is inflowing contact with the oxygen before about up to 55–60 mg/l oxygen is dissolved in the water. Is known method and apparatus works very well, however, it was desired to develop a high capacity, smaller and less costly and more portable apparatus capable of producing on an industrial scale super oxygenized water containing even more oxygen and retaining the dissolved oxygen for longer periods than with the known method.

Effective bioremediation requires a high rate of oxygen use, but replenishment of oxygen occurs very slowly in groundwater. As a result, oxygen levels in the contaminated systems are often quickly depleted, even when water has been thoroughly aerated before the onset of the bioremediation process. Bioremediation processes would be much more effective if oxygen levels could be maintained in the ground-water for a longer period of time after they are aerated. This means both higher concentrations of dissolved oxygen, and a lessened degree of degassing of oxygen from the water.

Groundwater pollution control efforts have generally focused on using various "pump and treat" methods which have met only with very limited success while being extremely costly and time consuming. A later development of bioremediation, also known as in-situ or passive remediation, has recently presented itself as a more cost-effective means of treatment, and is by far the most rapidly expanding sector of groundwater treatment technology. Most bioremediation sites utilize aerobic microorganisms to degrade the contaminants. In some circumstances the contaminants themselves are the primary substrate. However, due to resistance of most synthetic organic chemicals to biodegradation, the microbes often require an additional food source, such a methane or methanol to utilize the contaminants. In any case, the organisms need a surplus of dissolved oxygen to maintain the aerobic conditions necessary for accelerated by biodegradation.

Experience demonstrated to date that the maintenance of adequate dissolved oxygen levels is one of the larger challenges to bioremediation projects. It was determined that the greater the dissolved oxygen content, the greater and more rapid the treatment A study conducted by the U.S. Air Force in 1992 found that with about 35 mg/l dissolved oxygen feed water, an 80% reduction in dichloroethane could be obtained within 150 hours. In a laboratory study in 1993 it was found that vinyl chloride could be reduced by 95% within two weeks by infusing the contaminated groundwater with about 25 mg/l dissolved oxygen. Low dissolved oxygen bioremediation operations have proven to be very slow at best, and completely unsuccessful at worse. For example, in another 1993 experiment it was determined that oxygen levels around 18 mg/l produced little or no reduction in dichloroethane after twelve days.

Four different methods have been employed in the past to introduce oxygen into aquifers: air sparging, electrolysis, hydrogen peroxide, and surface aeration. All of these have limitations. Air sparging in the case of aquifers involved sinking wells into the aquifer to provide contact between the ground-water and the atmosphere. This, however, produces very low oxygen levels, comparable to those that occur naturally, of about 10–14 mg/l in cold water. Electrolysis was not found to offer any practical, real word applications, because concentrations of only up to 16 mg/l could be obtained but at the same time the organisms for the biodegradation became substantially depopulated. Hydrogen peroxide injection seemed promising only at first glance, because oxygen was produced only at ratio of 1:2 and two as high a concentration of hydrogen peroxide was required to arrive at the relatively low obtainable dissolved oxygen level. Furthermore, hydrogen peroxide proved toxic to the biodegradation organisms and the resulting foam and dead organisms clogged the injection wells.

The best remaining known option was above-ground aeration wherein a portion of the groundwater was pumped up, aerated with air or pure oxygen, and injected back in to the aquifer. When using pure oxygen, dissolved oxygen levels of about 35 mg/l have been obtained in 1992, but theme were diluted upon reentering the aquifer.

A direct relationship between the biological activity and the high oxygen levels could be established, and the activity dropped sharply with lower dissolved oxygen levels. The observations have clearly indicated the need for even higher levels of dissolved oxygen for accelerating the bioremediation for more optimum rates.

Oxygenated water, when exposed to ambient atmosphere, will gradually lose the dissolved oxygen content above the amount (about 10–12 mg/l) that can be maintained under atmospheric equilibrium dynamics.

DESCRIPTION OF THE INVENTION

It is an object of the present invention to enable the production of water highly enriched with oxygen with a higher concentration of dissolved oxygen and with longer retention of the dissolved oxygen in the water than has been possible in the prior art, to provide a smaller, less costly and more portable apparatus for the industrial production of such super oxygenated water, and to provide for the improved utilization of such super oxygenated water.

Another object of the present invention is to enable industrial scale, continuous production of heretofore unavailable air oxygen levels dissolved in water, with a good retention of the dissolved oxygen, and at substantially reduced cost.

As used throughout the, specification and the claims, "water" is also meant to include any other liquid that is capable of super oxygenation, including flavored water and other ingestive beverages.

The process of the present invention is an improvement in a process for enriching water with oxygen, wherein water is conducted through a water inlet into a sealed enriching space, oxygen is introduced through an oxygen inlet into the water in the enriching space, and the oxygen-enriched water is recovered thereafter, the improvement comprises the enriching space including a turbulent mixer, and the water is conducted with the oxygen through the turbulent mixer for incorporating the oxygen into the water before recovering the oxygen-enriched water.

The present invention further includes an improvement in an apparatus for enriching water with oxygen, the apparatus having a water inlet, an oxygen inlet, a sealed enriching spaces and an outlet for oxygenated water, the improvement comprising the sealed enriching space including the oxygen inlet and a turbulent mixer.

The process of the present invention virtually eliminates any dissolved oxygen deficiencies for most bioremediation and other aerobic processes thereby substantially reducing the time and cost of defective site treatment. The apparatus and the process of the present invention rapidly infuses contaminated groundwater to dissolved oxygen levels in excess of 65 mg/l. Pure oxygen can be infused at about 40 psi, suitably at about 50 to about 55 psi pressure which is capable of treating over 50,000 gallons per day.

The present invention can achieve even higher dissolved oxygen concentrations either at lower flow rates and/or with apparatus designed for higher throughput. Such higher throughput can be obtained, for example, by increasing the oxygen pressure and/or providing additional mixing capacity, such as by the use of larger mixers, or connecting a number in mixers in parallel.

Further, as used throughout the specification and the claims "turbulent mixer" means a device, usually an elongated tubular, cylindrical or any other cross-section member having a hollow interior containing vanes or other flow-directing elements for causing turbulent flow therein to create a mixing effect in liquid flowing within the device. A turbulent mixer can suitably be a static mixer in which the flow directing elements are in a stationary or fixed position, or a dynamic mixer in which some or all of the elements can either freely rotate, or be rotated by a drive to intensify the mixing effect.

It was surprisingly found that water prepared by the aforementioned U.S. patent application Ser. No. 08/411,708 could produce a dissolved oxygen level of about 60–65 mg/l which will reach the atmospheric equilibrium level of about 10–12 mg/l within about 24 hours, whereas the water oxygenated by the use of a four simple series-connected static mixers in accordance with the present invention, when initially containing about 70 mg/l, will lose the amount of oxygen to reach equilibrium levels in about 48 hours. The reason for this slower oxygen loss is not known, but the process and apparatus of the present invention produce not only higher oxygen concentrations, but even importantly, the oxygen losses to the ambient atmosphere of waters prepared by the present inventions are slower, at about half the rate of water oxygenated in accordance with the prior art. It is believed that the thorough mixing which results in a greater amount of oxygen being more thoroughly dissolved in the water, might account for that slower oxygen degassing loss.

It is believed that the present invention could be employed to obtain even substantially higher dissolved oxygen levels than 70 mg/l, such as by slower feed through flow rates and/or improving the entire mixing efficiency, such as employing mixers connected in parallel and/or using dynamic mixers in which the mixer elements are rotated to intensity the mixing effect.

Since it is expected that the lose of dissolved oxygen under ambient atmospheric conditions increases as far a the added amounts of dissolved oxygen are concerned, it is very lively to find a dissolved oxygen concentration (break-even level) above which under atmospheric conditions the loss of the increased amount of oxygen would be so fast that the cost and the effort may not match the benefit of incorporating such higher amounts of oxygen on an industrial scale. This does not necessarily apply to sealed bottles of highly oxygenated water or other beverages, because that can maintain its oxygen content under pressure practically indefinitely. This break-even level, however, is expected to be considerably above the about 70 mg/l concentration that has been so far routinely obtained on a industrial scale with relatively little effort in accordance with the present invention.

In the case of the treatment of groundwaters the highly oxygenated water is reinjected into an injection well immediately up-gradient of the contaminated plume. As the injection is made several feet below the water level in the injection well, any turbulence at the atmosphere-water interface can be kept to a minimum. Typically the oxygenated water penetrates into the surrounding porous media over several hours after injection with a substantial minimum of turbulence due to the slow flow rate. Once the highly oxygenated water penetrates the contaminated aquifer, very little oxygen degassing is expected due to the combination of hydrostatic pressure, the low velocity nonturbulent flow condition and the rapid microbe utilization of the dissolved oxygen. Therefore, most of the oxygen is used for microbial respiration rather than is lost due to pore degassing.

It is expected that, depending on the operational parameters, from about 35 to about 110 mg/l oxygen can be incorporated into water in accordance with the present invention. Typically, the use of a four static mixer tube apparatus of the present invention, each with a 2" ID, could conveniently produce up to 100,000 gallons of water per day. The scope of the present invention encompasses providing a plurality of turbulent mixers, each turbulent mixer having an inside diameter of between about 0.5" and about 5". The oxygen in water input can be adjusted over a very wide range, such as to obtain a dissolved oxygen concentration of between about 65 and about 70 mg/l.

The present invention is suitable for treating all waste waters which create a high demand for oxygen. However the process and apparatus of the present invention are also suitable for use in aerobic processes and other processes such as therapeutic processes advantageously employing oxygen containing liquids.

As used throughout the specification and the claims reference to an "aerobic" process generally includes all chemical and microbiological processes in which such a process is carried out or is promoted in a liquid medium in the presence of oxygen. AS used throughout the specification and the claims "therapeutic" processes involve the oxygenation of the body or its parts by treatment with an agent in a liquid vehicle containing dissolved oxygen.

Suitably aerobic processes in which water oxygenated in accordance with the present invention can be employed include for example processes in which heretofore water has been aerated such as by bubbling air thereinto, and also in situ or ex situ bioremediation of contaminated (e.g. with petroleum products) surface and ground waters; wastewater, sludge, and animal waste treatments both by fixed film and by suspended growth methods; rehabilitation of atrophying lakes; biochemical oxygen demand (BOD) measurement techniques; fresh water aquaculture (e.g fish farming); odor suppression barriers for anaerobic processes; and insolubilization of dissolved contaminants (e.g. Fe, and Mn ions) for removal by filtration or sedimentation.

In view of the particularly good oxygen retention of liquids oxygenated by the present invention kept in containers, a particularly advantageous new aerobic use of those liquids was discoverer In accordance with a further feature of the present invention such oxygenated liquids can be advantageously employed as the fermentation liquor of all kinds of fermentation processes, such as drug production or food processing by microorganisms.

Microorganisms such a bacteria consume massive quantities of oxygen in the process of a assimilating or breaking down waste. The rate at which oxygen can be introduced into the biomass is a substantial limiting factor on how quickly a breakdown by oxygenation can be achieved. The problem with the known process technologies is that oxygen introduction by aeration is highly inefficient because air contains only 21% percent oxygen and thus 79% percent of the energy used by aerators is wasted in pumping useless nitrogen. Therefore, the use of highly oxygenated water in accordance with the present invention in such aerobic processes is expected to be about 5 times more efficient, also to obtain thereby a like extent of energy efficiency improvement. Thus the infusion of water with 40–50 mg/l of oxygen allowed a considerably more efficient and much more rapid aerobic treatment, compared to 7–10 mg/l for the normal oxygen content of water, and just slightly more when a conventional bubbling separator is used with 20% oxygen containing air. Furthermore, as the equilibrium oxygen content of water is used up, its dissolved oxygen content rapidly decreases.

Suitable therapeutic processes in which liquids made in accordance with the present invention can be advantageously employed include, for example, increasing the oxygen content of blood and tissues; oxygenation of wounds to increase the rate of healing and to reduce infections; oxygenated organ transplant storage media tumor oxygenation for radiation therapy and chemotherapy; lung bypass by oxygenated liquids in case of pulmonary deficiencies; carbon monoxide poisoning; mouthwashes, dentifrices; topical, including cosmetic, treatment media; contact lens treating solutions; and cell level therapeutic applications.

Eight test subjects of various ages and of differing sex, had their blood oxygen contents and their pulse rates determined. Each subject drank between ½ and ¾ liters of highly oxygenated water. Evidence of a pulmonary function bypass was observed a short period after ingestion, by an average blood oxygen increase of about 30%, and the effect of a concomitant cardiac relief was observed through an average of about 10% pulse rate reduction.

In view of the especially good oxygen retention of liquids oxygenated by the present invention kept in containers, a particularly advantageous new therapeutic product of those liquids was discovered. In accordance with a further feature of the present invention such oxygenated liquids can be employed as solvents for physiological saline isotonic solutions, especially when kept in sealed, sterile containers.

If desired, the water treated in accordance with the present invention can also be made effervescent by the addition of a gas such as carbon dioxide. If the carbon dioxide is added after the dissolution of the oxygen in the water, then it will displace a portion of the dissolved oxygen. It has been found, however, that the effervescent liquid can be further enriched with oxygen to a substantial degree after the addition of the carbon dioxide. Even more oxygen can be dissolved in the water, if the water being enriched with the oxygen is chilled at the time of the oxygen enrichment. However, some of the chilling or the entire lack of chilling can be substituted by the employment of higher oxygen pressures such as around 50 psi or higher.

An apparatus in accordance with the present invention oxygenating water at an experimental fish farm, where the fish did not require the maintenance of elevated oxygen levels, but only the maintenance of dissolved oxygen concentration of about 9–12 mg/l the cost of the required power was about 8 cents per hour, and the overall cost per kilogram of dissolved oxygen produced was about 79 cents per kilogram dissolved oxygen.

In another experiment highly concentrated formate/acetate industrial effluent waste streams were treated having an approximate biological oxygen demand (BOD=10,000 mg/l), were successfully treated so that the aerobic biodegradation of the waste stream, even before process optimization, was able to achieve an 80% reduction in total organic carbon levels in less than three hours of intense treatment Thus the use of the apparatus in accordance with the process of the present invention results in a very inexpensive and very efficient technique.

Therefore, the evidence is present that the present invention is more suitable for oxygenating and super oxygenating liquids than the techniques of air sparging, electrolysis, hydrogen peroxide, pumping and other methods known from the prior art.

Oxygen concentrations in the oxygenated water prepared in accordance with the present invention were measured with a Model 830 and a Model 840 dissolved oxygen meters sold by ATI Orion Analytical Technology, Inc. When the two meters were at the same location, they were used to compare the measurements which have been found to correlate satisfactorily.

BRIEF DESCRIPTION OF THE DRAWING

The invention is descried in greater detail with reference being had to the enclosed drawings, wherein.

DETAILED DESCRIPTION OF THE INVENTION

Figure 1:
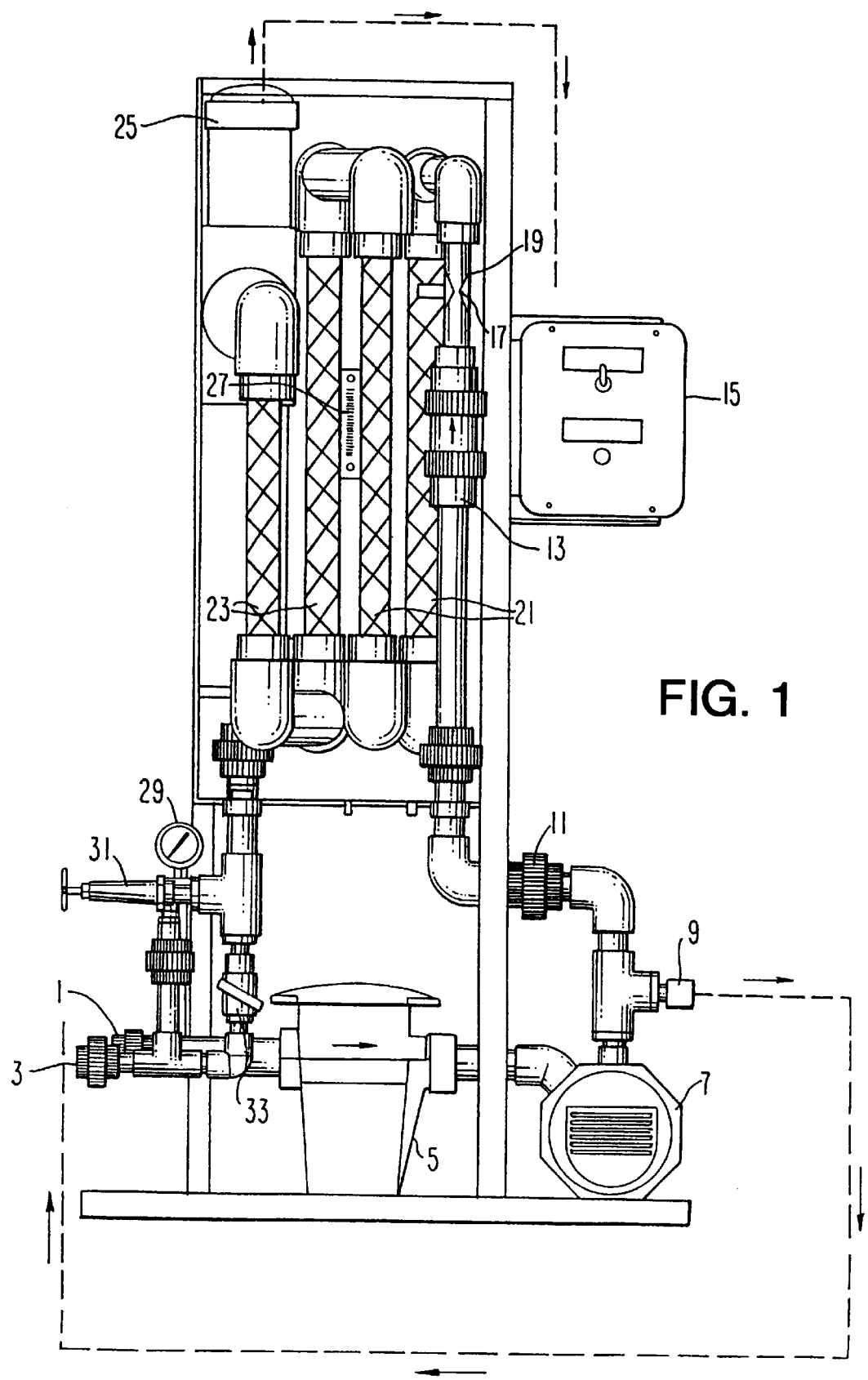
FIG. 1 is a side view and partial schematic of the apparatus of the present invention.

FIG. 1 shows the oxygen—saturating apparatus of the present invention. Water is introduced through a water inlet 1 which is suitably a 1.5 inch OD pipe. Oxygenated water exits from the system through a water outlet 3, suitably a 1" OD pipe. The water can be lead to the apparatus through the inlet 1 from the water mains, or a water supply a (not shown) and the like. Suitably the water is passed through a basket strainer 5 to remove any solid contaminants, particularly if the starting water is a wastewater or a recirculated water. From the basket strainer 5 the water passes through a pump 7 which further feeds the input water at a uniform pressure into the apparatus.

When the oxygenated water removed at the water outlet 3 is removed periodically, such as when the oxygenated is bottled, upon the cessation of flow at the outlet 3, a backflow pressure regulator 9 opens and recirculates the input water along the path indicated by the broken line to the water inlet 1, or to the optional water supply tank from where the input water may be drawn. When the water pressure at the water outlet 3 is above a certain values the back-flow pressure regulator 9 is closed and the pump passes the water into the oxygenation apparatus through an apparatus input 11 and a unidirectional flow-assuring check valve 13. The operation of the pump 7 is regulated by a pump control panel 15, and its associated conventional circuitry.

Oxygen input to the apparatus occurs at 27 through a venturi mixer 19. The oxygen flow can be obtained from many convenient sources, suitably from an oxygen generator manufactured by Airsep Corp. The simple Airsep oxygen generator produces about 45 ft$^3$/hr $O_2$ at about 50–55 psi. This requires an output water pressure from pump 7 of about 70 psi. In the case of a higher oxygen input pressure to the venturi mixer 19 the output water pressure of the pump 7 may not need to be as high. If a higher $O_2$ production rate is desired, a more productive $O_2$ generator, or more $O_2$ generators connected in parallel can be used.

The venturi mixer 19 distributes the oxygen input in the water flow as bubbles and also as some amount of oxygen dissolved in the water flowing through the venturi mixer from where the water is passed so four turbulent mixers connected in series. In FIG. 1 the first two turbulent mixers are static mixers 21, and the last two mixers in the series connection are dynamic mixers 23. The static mixers 21 are suitably 2" ID tubular units sold under the trademark Komax by Ryan Harco Co. The dynamic mixers 23, in contrast with the static mixers 21 have rotary mixing vanes that are rotated inside the mixers by an exterior driving motor M (see FIG. 4). The turbulent mixers are connected in series, and each has an inside diameter of between about 0.75" and about 2". The design of the rotating mixer elements, and their speed of rotation determines the intensity of the mixing that takes place within the dynamic mixer. The intensity of mixing taking place in the static mixers 21 depends on the resultants of the introduced water pressure and oxygen pressure and the design features of the interior mixing vanes. The mechanical agitation which takes place to varying degrees within the various yes of turbulent mixers 21 and 23 forces the thorough incorporation of the oxygen in the water.

The water exiting the last mixer 23 passes through a bubble remover 25 in which a pipe (not shown) ranges below the water level of the water flowing through the remover, and any free, undissolved oxygen bubbles rise through the pipe and are recirculated along the broken line to the oxygen input 17. The amount oxygen entering through the oxygen input 17, including the oxygen recirculated from the bubble remover, can be monitored by an oxygen flow meter 27.

After the bubble remover 25, the oxygen-saturated water passes through a pressure gauge 29 to an output backflow regulator 31. The output back flow regulator 31 has only a limited throughput of about 25 gallons per minute. Therefore, a regulator bypass valve 33 passes the smaller amount of throughput through the bypass that is in excess of the regulator throughput. The provision of such a bypass is a simpler and less expensive solution, than the use of a higher throughput backflow regulator which is disportionately expensive. The output of the regulator 31 and the water passing through the bypass valve 33, exit from the apparatus through the water outlet 3. The role of the regulator 31 is to close and bar most or all of the outflow of oxygenated water through the outlet 3. This takes place when the pressure in the sealed enriching space falls below a present value, suitably about 40 psi. Such pressure loss can occur in the turbulent mixers for example, when too much oxygenated water has passed through thee outflow 3. In that case, the output backflow regulator 31 closes to prevent most of all of the outflow of oxygenated water from the system. The pressure within the sealed enriching space thereupon rapidly increases and this results in the input backflow pressure regulator 9 shutting down, and the input water begins to recirculate to the water inlet 1. If any valves on the output side of the apparatus are closed, then no oxygenated water will leave the system while the outlet backflow regulator 31 is closed. If, on the other hand, any valves on the output side are open except for the outlet backflow regulator 31, only a relatively minor proportion of the oxygenated water passes through the regulator bypass valve 33, and the required pressure buildup within the sealed enriching space remains assured.

Figures 2, 3:
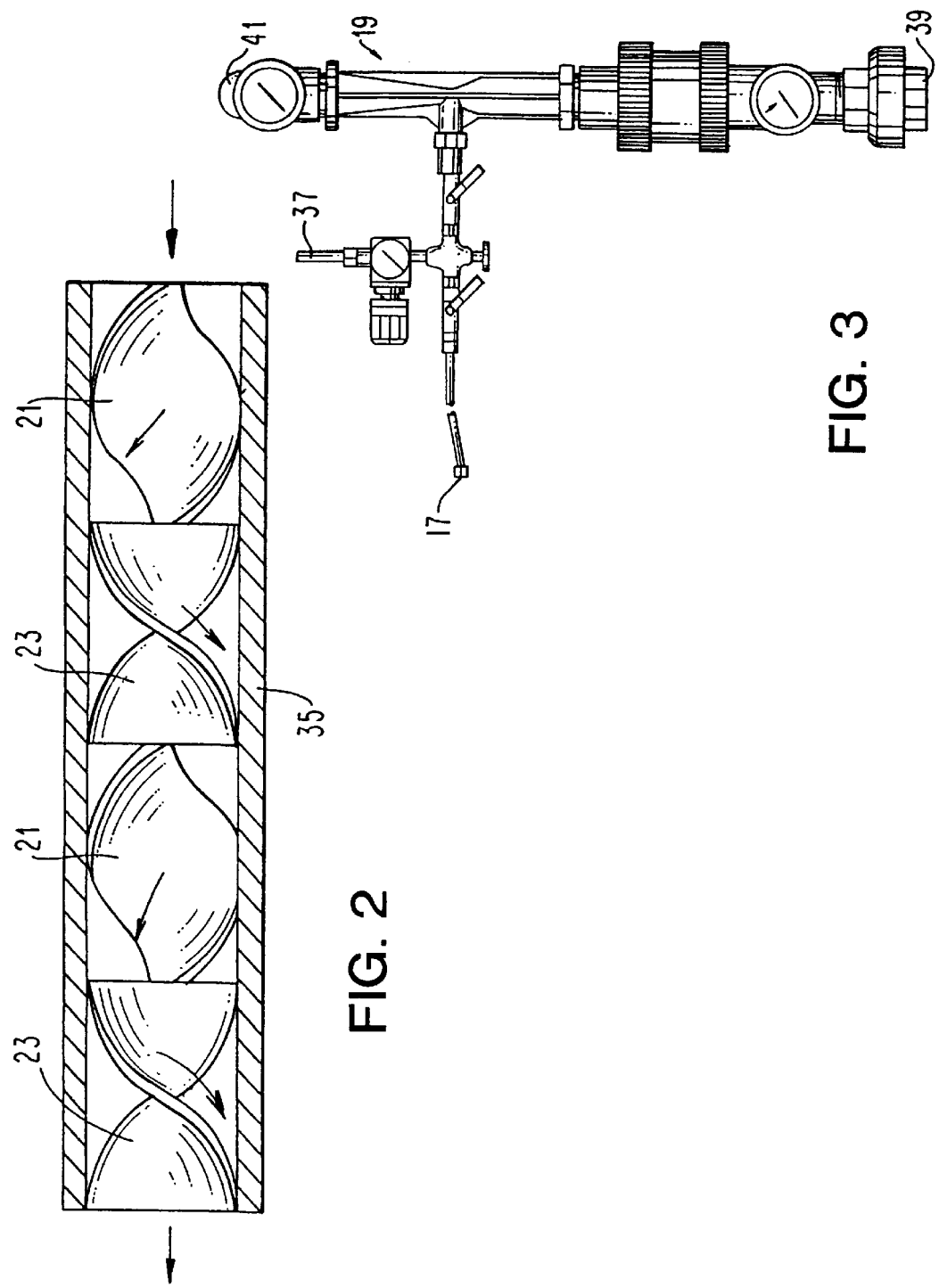
FIG. 2 shows four ganged turbulent mixer elements.
FIG. 3 is a side view of an oxygen mixing ventrui.

FIG. 2 shows the design of a suitable turbulent mixer 35, in which static mixers 21 are connected alternate in series with dynamic mixer 23. The mixer 35 contains a plurality mixers, each containing twisted elements. The mixers are arranged axially and alternatigly within the cylindrical body. Some elements are twisted for example clockwise, and some of the other elements can be twisted counterclock or vice versa, when they are viewed from the inlet side of the mixer 35.

The venturi mixer 19 is shown in greater detail in FIG. 3 with the oxygen entering through the oxygen input 17 with an optional extra oxygen outlet 37 for optional extra introduction of oxygen at some other desired point into the system, a water input 39 and a water with oxygen output 41.

Figure 4:
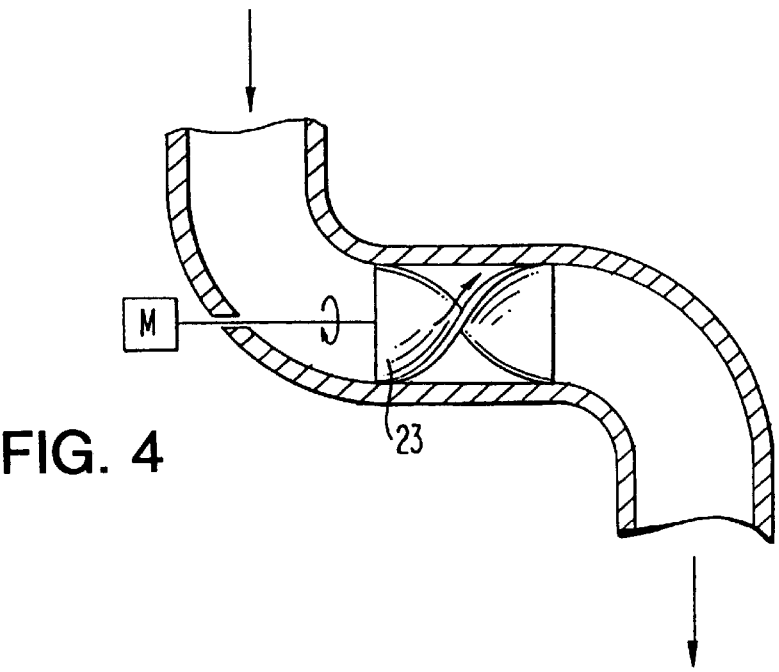
FIG. 4 is a schematic showing of a dynamic mixer.

The operating principle of a dynamic mixer is schematically shown in FIG. 4, where a dynamic mixer element 23 is adapted to rotate inside the dynamic filter, as driven by a motor M. Suitably the speed of the motor M is variable to permit an adjustment of the mixing intensity of the dynamic mixer 23.

Figure 5:
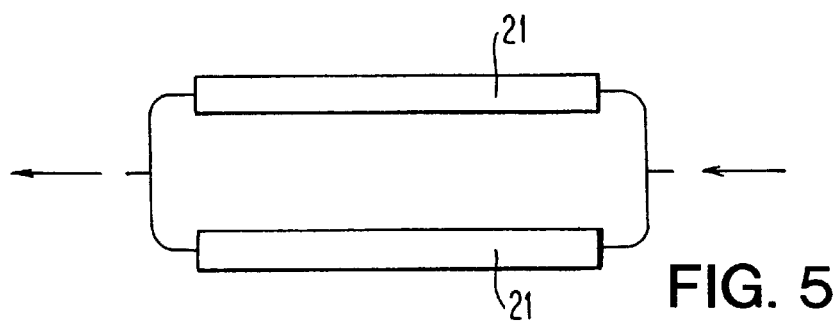
FIG. 5 is a schematic showing of turbulent mixers connected in series.
Figure 6:
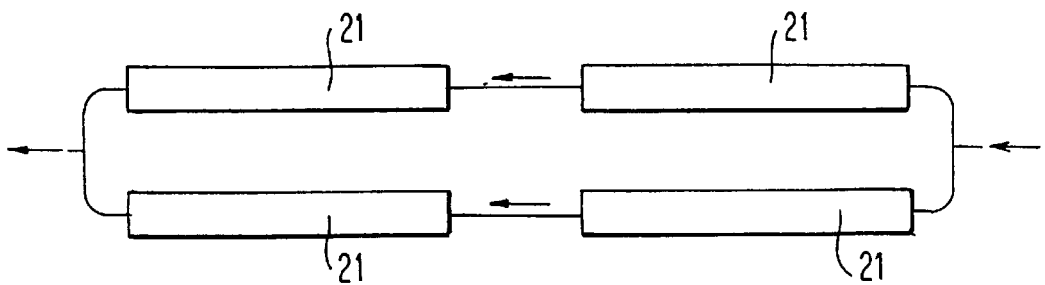
FIG. 6 is a schematic showing of turbulent mixers connected in parallel and the parallel mixers are connected in series.

FIGS. 5 and 6 are schematic showings of turbulent mixer elements connected in parallel and connected in parallel and in series, respectively.

We claim:

1. An aerobic process which comprises carrying out one of a chemical reaction and a biological reaction in a reaction medium comprising an oxygen enriched liquid having an oxygen content of at least 40 mg/l oxygen prepared by a process which comprises the steps of:

providing a sealed oxygen enriching space having a turbulent mixer comprising a generally tubular section disposed therein;

maintaining an oxygen pressure of at least 40 psi in the sealed oxygen enriching space;

introducing the liquid through a liquid inlet into the sealed oxygen enriching space;

introducing oxygen through an oxygen inlet into the sealed oxygen enriching space;

passing the liquid and the oxygen through the turbulent mixer to thereby generate turbulence in the liquid and the oxygen to dissolve the oxygen into the water; and recovering oxygen-enriched liquid having a dissolved oxygen concentration of at least 40 mg/l from said turbulent mixer, wherein said step of providing a sealed oxygen enriching space comprises providing an enriching space having a venturi for introducing oxygen into the liquid before substantially dissolving the introduced oxygen in the liquid in said turbulent mixer.

2. A therapeutic process which comprises carrying out a therapeutic treatment of a body with an agent comprising an oxygen enriched liquid as a vehicle, the liquid having been prepared by a process which comprises the steps of:

providing a sealed oxygen enriching space having a turbulent mixer comprising a generally tubular section disposed therein;

maintaining an oxygen pressure of at least 40 psi in the sealed oxygen enriching space;

introducing the liquid through a liquid inlet into the sealed oxygen enriching space;

introducing oxygen through an oxygen inlet into the sealed oxygen enriching space;

passing the liquid and the oxygen through the turbulent mixer to thereby generate turbulence in the liquid and the oxygen to dissolve the oxygen into the water, wherein said step of providing a sealed oxygen enriching space comprises providing an enriching space having a venturi for introducing oxygen into the liquid before substantially dissolving the introduced oxygen in the liquid in said turbulent mixer;

and recovering oxygen-enriched liquid having a dissolved oxygen concentration of at least 40 mg/l from said turbulent mixer.

3. The therapeutic process of claim 2, wherein said agent consists solely of said oxygen enriched liquid.

4. A fermentation process which comprises fermenting a fermentation liquor comprising an oxygen enriched liquid prepared by a process which comprises the steps of:

providing a sealed oxygen enriching space having a turbulent mixer comprising a generally tubular section disposed therein;

maintaining an oxygen pressure of at least 40 psi in the sealed oxygen enriching space;

introducing the liquid through a liquid inlet into the sealed oxygen enriching space;

introducing oxygen through an oxygen inlet into the sealed oxygen enriching space;

passing the liquid and the oxygen through the turbulent mixer to thereby generate turbulence in the liquid and the oxygen to dissolve the oxygen into the water, wherein said step of providing a sealed oxygen enriching space comprises providing an enriching space having a venturi for introducing oxygen into the liquid before substantially dissolving the introduced oxygen in the liquid in said turbulent mixer; and recovering oxygen-enriched liquid having an oxygen content of at least 40 mg/l oxygen.

5. An apparatus for enriching a liquid with oxygen to a dissolved oxygen concentration level of at least 40 mg/l comprising: a liquid inlet, a sealed enriching space including a turbulent mixer having a generally tubular section for mixing oxygen into said liquid; a venturi including an oxygen inlet, said ventrui being disposed between said liquid inlet and said turbulent mixer for introducing an oxygen and liquid mixture into said turbulent mixer; means for maintaining a sufficient oxygen pressure in the sealed enriching space to enrich said liquid; and an outlet for recovering said liquid having a dissolved oxygen concentration level of at least 40 mg/l from said apparatus.

6. An aerobic process which comprises carrying out one of a chemical reaction and a microbiological reaction in an oxygen enriched liquid as the reaction medium, the liquid having been prepared with the apparatus of claim 5 and having a dissolved oxygen concentration of at least 40 mg/l.

7. A therapeutic process which comprises carrying out a therapeutic treatment of a body with an agent comprising an oxygen enriched liquid as a vehicle, the liquid having been prepared with the apparatus of claim 5.

8. The therapeutic process of claim 7, wherein said agent consists solely of said oxygen enriched liquid.

9. A fermentation process which comprises fermenting a fermentation liquor comprising an oxygen enriched liquid prepared with the apparatus of claim 5 and having a dissolved oxygen concentration of at least 40 mg/l.

10. The apparatus of claim 5, wherein said turbulent mixer comprises a plurality of turbulent mixers.

11. The apparatus of claim 10, wherein said plurality of turbulent mixers comprises one of static mixers, dynamic mixers, and a combination of at least one static mixer and at least one dynamic mixer.

12. The apparatus of claim 11, wherein said mixers are connected in one of in parallel, in series, and in parallel and in series.

13. The apparatus of claim 12, wherein four turbulent mixers are connected in series, each said turbulent mixer having an inside diameter between about 0.75" and about 2".

14. The apparatus of claim 10, wherein said plurality of turbulent mixers are connected in parallel with each other.

15. The apparatus of claim 10, wherein said turbulent mixer is a first turbulent mixer connected in series with a second turbulent mixer, said second turbulent mixer comprising a plurality of parallel-connected turbulent mixers.

16. The apparatus of claim 10, wherein each of said turbulent mixers has an inside diameter between about 0.5" and about 5".

17. The apparatus of claim 5, further comprising a liquid input pump between said liquid inlet and said venturi.

18. The apparatus of claim 17, further comprising a liquid back-flow pressure regulator between said pump and said venturi, and an unoxygenated liquid bypass conduit for recirculating unoxygenated liquid to said liquid inlet in response to the pressure within said sealed enriching space rising above a predetermined level.

19. The apparatus of claim 5, further comprising a bubble remover in said sealed enriching space disposed between said turbulent mixer and said oxygenated liquid outlet for removing oxygen bubbles from the oxygenated liquid, and an oxygen bypass conduit fluidly connecting said bubble remover and said oxygen inlet.

20. The apparatus of claim 5, further comprising an oxygenated liquid back-flow pressure regulator having a throughput capacity, and an oxygenated liquid bypass valve for bypassing said oxygenated liquid back-flow pressure regulator when the outflow of oxygenated liquid from said sealed enriching space exceeds said throughput capacity.

21. The apparatus of claim 20, wherein said oxygenated liquid back-flow pressure regulator is adapted to restrict the outflow of oxygenated liquid when the pressure in said sealed enriching space falls below a preselected value.

* * * * *